(12) United States Patent
Morton et al.

(10) Patent No.: US 9,959,251 B2
(45) Date of Patent: *May 1, 2018

(54) USING CONTENT STRUCTURE TO SOCIALLY CONNECT USERS

(71) Applicant: Google Inc., Mountain View, CA (US)

(72) Inventors: Michael Salomon Morton, Lyme, NH (US); Jeremy Faller, Arlington, MA (US)

(73) Assignee: Google LLC, Mountain View, CA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/339,547

(22) Filed: Oct. 31, 2016

(65) Prior Publication Data
US 2017/0046312 A1 Feb. 16, 2017

Related U.S. Application Data

(63) Continuation of application No. 14/286,363, filed on May 23, 2014, now Pat. No. 9,514,101.

(51) Int. Cl.
*G06F 17/00* (2006.01)
*G06F 17/21* (2006.01)
(Continued)

(52) U.S. Cl.
CPC .......... *G06F 17/212* (2013.01); *G06F 3/0483* (2013.01); *G06F 3/04847* (2013.01);
(Continued)

(58) Field of Classification Search
CPC .. G06F 3/0483; G06F 17/212; G06F 17/2785; G06F 17/30699; G06Q 50/01; H04L 51/12; H04L 51/32
(Continued)

(56) References Cited

U.S. PATENT DOCUMENTS

| 7,246,118 B2 | 7/2007 | Chastain et al. |
| 8,260,915 B1 | 9/2012 | Ashear |
| | (Continued) | |

FOREIGN PATENT DOCUMENTS

| JP | 2000215205 | 8/2000 |
| JP | 2002312380 | 10/2002 |
| KR | 20020006948 | 1/2002 |

OTHER PUBLICATIONS

Konstan et al., Applying Collaborative Filtering to Usenet News, ACM 1997, pp. 77-87.*
(Continued)

*Primary Examiner* — Cong-Lac Huynh
(74) *Attorney, Agent, or Firm* — Shumaker & Sieffert, P.A.

(57) ABSTRACT

The structure of a digital content item is used to socially connect users consuming the digital content item. The structured representation of the digital content item is determined. This structured representation is analyzed to identify key events within the digital content item. A user's current location within the digital content item is identified. Social communications of the user are filtered responsive to the user's current location and the identified key events within the digital content item. In this way, the user may peruse social media without inadvertently reading communications that give away (e.g., spoil) key events such as important plot points.

18 Claims, 6 Drawing Sheets

(51) Int. Cl.

| | | |
|---|---|---|
| *G06F 3/0483* | (2013.01) | |
| *G06F 3/0484* | (2013.01) | |
| *H04L 12/58* | (2006.01) | |
| *H04L 29/08* | (2006.01) | |
| *G06Q 50/00* | (2012.01) | |
| *G06F 17/24* | (2006.01) | |
| *G06F 17/27* | (2006.01) | |
| *G06F 17/30* | (2006.01) | |

(52) U.S. Cl.
CPC ........ *G06F 17/241* (2013.01); *G06F 17/2705* (2013.01); *G06F 17/2785* (2013.01); *G06Q 50/01* (2013.01); *H04L 51/12* (2013.01); *H04L 51/32* (2013.01); *H04L 67/10* (2013.01); *G06F 17/30699* (2013.01)

(58) Field of Classification Search
USPC .......................................................... 715/200
See application file for complete search history.

(56) References Cited

U.S. PATENT DOCUMENTS

| | | | |
|---|---|---|---|
| 8,346,589 B1 | 1/2013 | Norton et al. | |
| 8,478,757 B2* | 7/2013 | Leibu .................... | G06Q 30/02 707/736 |
| 8,706,685 B1 | 4/2014 | Smith et al. | |
| 8,869,017 B2 | 10/2014 | Piantino et al. | |
| 8,874,731 B1* | 10/2014 | Puppin .............. | G06F 17/30867 707/736 |
| 9,026,934 B1* | 5/2015 | Shah ..................... | G06F 3/0483 715/776 |
| 9,116,654 B1 | 8/2015 | Shah | |
| 9,128,591 B1 | 9/2015 | Arora et al. | |
| 9,213,705 B1 | 12/2015 | Story, Jr. et al. | |
| 9,275,047 B1 | 3/2016 | Yanovsky et al. | |
| 9,275,052 B2 | 3/2016 | Siegel et al. | |
| 9,305,061 B2 | 4/2016 | Basso et al. | |
| 9,501,561 B2* | 11/2016 | Rubin ................ | G06F 17/30867 |
| 9,531,823 B1* | 12/2016 | Suchland .............. | H04W 4/023 |
| 9,807,044 B2* | 10/2017 | Agarwal ................. | H04L 51/14 |
| 2004/0021685 A1 | 2/2004 | Denoue et al. | |
| 2004/0199631 A1 | 10/2004 | Natsume et al. | |
| 2005/0097451 A1 | 5/2005 | Cormack et al. | |
| 2008/0019665 A1 | 1/2008 | Huang et al. | |
| 2008/0250080 A1 | 10/2008 | Arrasvuori et al. | |
| 2009/0006369 A1 | 1/2009 | Guday et al. | |
| 2010/0281034 A1 | 11/2010 | Petrou et al. | |
| 2011/0010774 A1 | 1/2011 | Park et al. | |
| 2012/0105460 A1 | 5/2012 | Kim | |
| 2012/0210203 A1 | 8/2012 | Kandekar et al. | |
| 2012/0240081 A1 | 9/2012 | Sim et al. | |
| 2012/0324392 A1 | 12/2012 | Mbenkum et al. | |
| 2013/0090956 A1 | 4/2013 | Ripsher et al. | |
| 2013/0151954 A1 | 6/2013 | Ierullo | |
| 2013/0185198 A1* | 7/2013 | Lorch .................... | G06Q 20/29 705/39 |
| 2013/0246157 A1 | 9/2013 | Puppin et al. | |
| 2013/0254008 A1 | 9/2013 | Ovick et al. | |
| 2013/0297706 A1 | 11/2013 | Arme et al. | |
| 2013/0304828 A1 | 11/2013 | Robertson et al. | |
| 2013/0311587 A1* | 11/2013 | Malik .................... | G06Q 10/00 709/206 |
| 2013/0311870 A1 | 11/2013 | Worsley et al. | |
| 2014/0038154 A1 | 2/2014 | Brownlow et al. | |
| 2014/0052741 A1 | 2/2014 | Yoshida et al. | |
| 2014/0115436 A1* | 4/2014 | Beaver ................ | G06F 17/2288 715/229 |
| 2014/0089775 A1 | 5/2014 | Worsley et al. | |
| 2014/0214941 A1 | 7/2014 | Shapero et al. | |
| 2015/0006258 A1* | 1/2015 | Salama .............. | G06Q 30/0206 705/7.35 |
| 2015/0134675 A1* | 5/2015 | Ellis .................. | G06F 17/30699 707/754 |
| 2015/0178403 A1 | 6/2015 | King | |
| 2015/0228197 A1 | 8/2015 | McKinney et al. | |
| 2015/0277679 A1 | 10/2015 | Toh | |
| 2015/0310002 A1 | 10/2015 | Yu et al. | |
| 2015/0350149 A1* | 12/2015 | Acharya ................. | H04L 51/32 709/206 |
| 2015/0363796 A1* | 12/2015 | Lehman ............. | G06Q 30/0201 705/7.29 |
| 2016/0149967 A1 | 5/2016 | Lewis et al. | |
| 2016/0156628 A1 | 6/2016 | Nukala et al. | |

OTHER PUBLICATIONS

Amazon.com, Inc., "Kindle Touch User's Guide," 2004-2011, 27 pages, can be retrieved at <URL:http://kindles3.amazonaws.com/Kindle_Touch_Users_Guide.pdf>.
Farzan, R. et al.. "Social Navigation Support through Annotation-based Group Modeling," Springer 2005, pp. 463-472.
Gruber, T., "Collective Knowledge Systems: Where the Social Web Meets the Semantic Web," Elsevier 2008, pp. 4-10.
International Search Report and Written Opinion for PCT International Application No. PCT/US2014/066299, dated Feb. 26, 2015, 11 pages.
International Search Report and Written Opinion for PCT International Application No. PCT/US2015/028370, dated Jul. 27, 2015, 10 pages.
Lie, D.H., "Sumatra: A System for Automatic Summary Generation," Carp Technologies, 1998, 6 pages, [Online] [Retrieved on Oct. 12, 2012] Retrieved from the Internet<URL:http://www.mariapinto.es/ciberabstracts/Articulos/Sumatra- .htm>.
Mock, K. "Hybrid Hill-Climbing and Knowledge-Based Techniques for Intelligent News Filtering," Citeseer 1996, pp. 1-18.
Schafer, J.B. et al., "Collaborative Filtering Recommender Systems," Springer 2007, pp. 291-324.
Schreck, T. et al., "Visual Analysis of Social Media Data," IEEE 2013, pp. 68-75.
Stone, Z. et al., "Autotagging Facebook: Social Network Context Improves Photo Annotation," IEEE 2008, pp. 1-8.
Wasfi, A., "Collecting User Access Patterns for Building User Profiles and Collaborative Filtering," ACM 1998, pp. 57-64.
Wikipedia, "Automatic Summarization," Last Modified Nov. 22, 2011, 11 pages, [Online] [Retrieved on Nov. 29, 2011] Retrieved from the Internet<URL:http://en.wikipedia.org/w/index.php?>.
Response to Communication Rules 161(2) and 162 EPC from counterpart European Application No. 15795843.0, dated Jul. 4, 2017, 15 pages.
European Search Report dated Oct. 5, 2017 received in counterpart EP application No. 15795843.0, 10 pps.

* cited by examiner

USING CONTENT STRUCTURE TO SOCIALLY CONNECT USERS

CROSS REFERENCE TO RELATED APPLICATIONS

This application is a continuation of U.S. patent application Ser. No. 14/286,363, filed May 23, 2014, which is hereby incorporated by reference in its entirety.

TECHNICAL FIELD

This disclosure relates generally to the field of digital content, and specifically to social interactions among consumers of digital content such as electronic books.

BACKGROUND

Many people now consume books and other content items electronically. Electronic books ("ebooks") in particular can be read using a variety of reading devices, such as dedicated reading devices and general-purpose computing devices. Each device includes reading software (an "ereader") that displays an ebook to a user and enables the user to read the ebook and perform other tasks.

Oftentimes people read ebooks as part of a social experience. For example, a reader might belong to a book club in which a group of people read and discuss the ebook together. The people can meet in person or via electronic forums.

However, a reader may have difficulty managing the online social reading experience for an ebook. Different people participating in an electronic forum may have different knowledge of the ebook. A reader may therefore instigate a discussion of an important plot point that another reader has not yet encountered. As a result, a person who participates in an electronic forum while reading an ebook risks having details such as important plot points spoiled by contributions from other readers. The social reading experience may therefore detract from the reader's enjoyment of the ebook.

SUMMARY

The above and other problems are addressed by a method and non-transitory computer-readable storage medium for using a structure of a digital content item to socially connect users consuming the digital content item. An embodiment of the method comprises determining a structured representation of the digital content item and analyzing the structured representation to identify key events within the digital content item. The method further comprises identifying a user's current location within the digital content item and filtering social communications of the user responsive to the user's current location and the identified key events within the digital content item.

An embodiment of the non-transitory computer-readable storage medium comprises executable computer program instructions executable to perform steps comprising determining a structured representation of the digital content item and analyzing the structured representation to identify key events within the digital content item. The steps further comprise identifying a user's current location within the digital content item and filtering social communications of the user responsive to the user's current location and the identified key events within the digital content item.

The above and other problems are addressed by a computing device for using a structure of a digital content item to socially connect a user consuming the digital content item using the computing device. An embodiment of the computing device comprises a computer processor for executing computer program instructions and a non-transitory computer-readable storage medium storing computer program instructions. The instructions are executable to perform steps comprising identifying key events within the digital content item and identifying the user's current location within the digital content item. The instructions are further executable to perform the steps of filtering social communications of the user responsive to the user's current location and the identified key events within the digital content item.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the disclosed subject matter.

DETAILED DESCRIPTION

The Figures (FIGS.) and the following description describe certain embodiments by way of illustration only. One skilled in the art will readily recognize from the following description that alternative embodiments of the structures and methods illustrated herein may be employed without departing from the principles described herein. Reference will now be made in detail to several embodiments, examples of which are illustrated in the accompanying figures. It is noted that wherever practicable similar or like reference numbers may be used in the figures to indicate similar or like functionality. This description identifies certain illustrated elements using reference numbers followed by letters. For clarity, this description often uses only the reference number to refer to any or all of the entities having that reference number.

In this disclosure, "digital content" generally refers to any machine-readable and machine-storable content, such as electronic books (ebooks), other digital text content (e.g., digital newspapers, digital news stories, electronic magazines, etc.), videos, and music. A "digital content item" refers to a particular piece of digital content, such as a particular ebook. The following discussion focuses on ebooks and therefore often describes use cases and examples involving ebooks and refers to the consumers of the content as "readers." However, the techniques described herein can also be used with other types of digital content.

Figure 1:
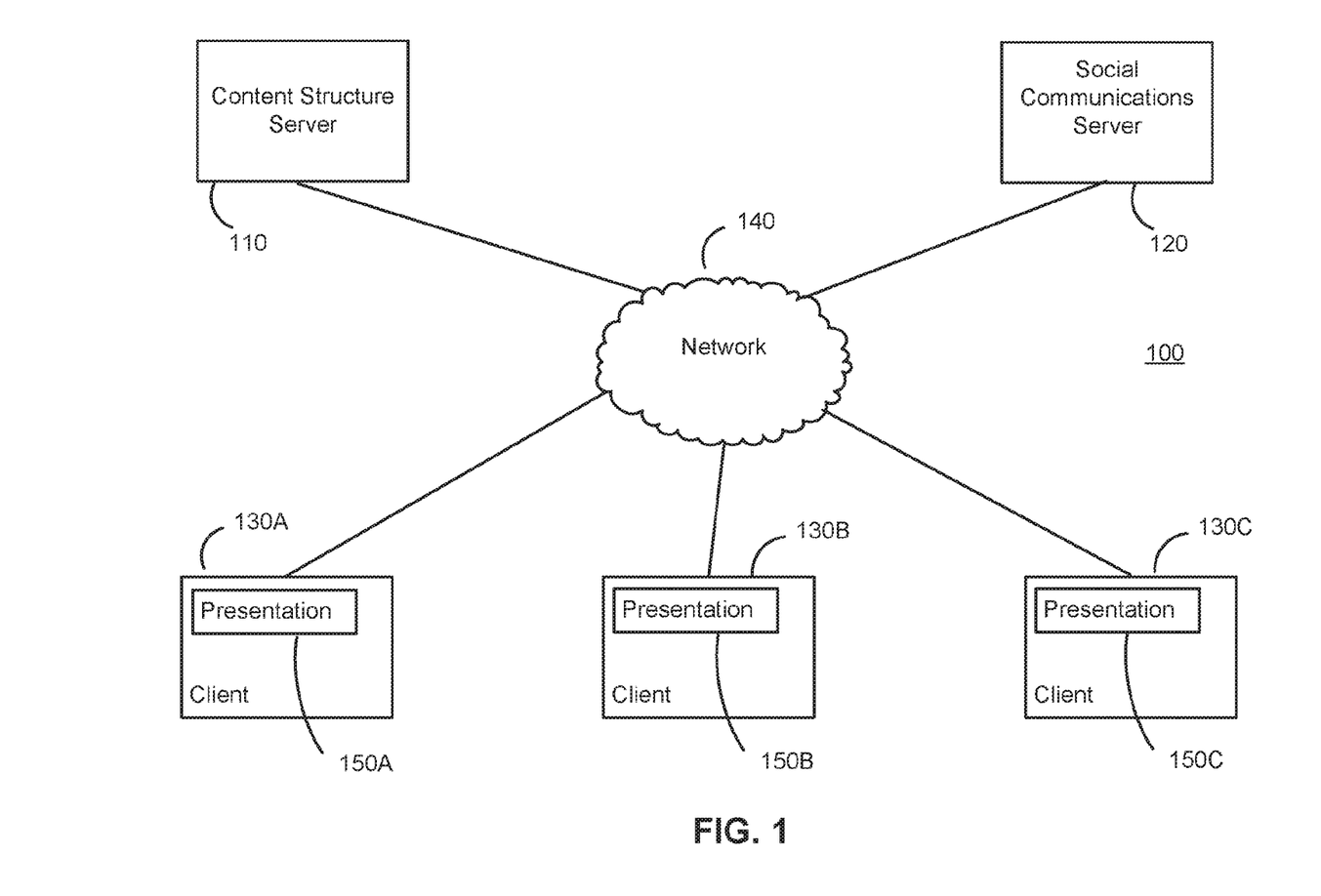
FIG. 1 shows a computing environment for using content structure to socially connect users.

FIG. 1 shows a computing environment 100 for using content structure to socially connect users. The computing environment 100 includes a content structure server 110, a social communications server 120, and multiple clients 130A, 130B, 130C connected by a communications network 140. Only one content structure server 110, one social communications server 120, and three clients 130A, 130B, 130C are shown in FIG. 1 in order to simplify and clarify the description. Embodiments of the computing environment 100 can have multiple content structure servers 110 and social communications servers 120, and many clients 130A, 130B, 130C connected to the network 140. Likewise, the functions performed by the various entities of FIG. 1 may differ in different embodiments.

The content structure server 110 determines the structures of digital content items, such as ebooks. As used herein, the "structure" refers to the arrangement of, and relations between, the parts or elements of the content item. In this context, the "parts or elements of the content item" refers to the substance of the content, i.e., the semantic meaning of the content. For example, if a content item is an ebook telling a fictional story, the structure of the content refers to a semantic description the characters and events described in the story, such as "A marries B; they have a child C; A and B divorce; A marries E; B dies." Each of these events introduces or modifies a relationship between elements in the story.

The content structure server 110 uses the determined structure of a content item to identify key events in the content item. A "key event" is an event that has a significant impact on the semantic meaning of the content within the content item. For example, a key event might be the introduction of an entity, such as a character, or an event that affects the entity in a way that is meaningful to the overall content. Returning to the example of the fiction ebook, key events might be those described above: "A marries B; they have a child C; A and B divorce; A marries E; B dies." Other events described in the story, such as "B has lunch" may have lesser impact on the story and are not necessarily key events.

The content structure server 110 associates the identified key events with specified locations in the content item. A location refers to a position within the content item, such as a particular sentence, paragraph, or chapter in an ebook or a particular time index in a video. Thus, the content structure server 110 identifies key events in the content item, and the positions in the content item at which the key events occur.

The clients 130 are electronic computing devices used by one or more users to perform functions such as consuming digital content items (e.g., reading an ebook), participating in social interactions with users of other clients, and browsing content hosted by servers on the network 140. For example, a client 130 may be a dedicated ebook reader, a smart phone, or a tablet, notebook, or desktop computer. The client 130 includes and/or interfaces with a display that presents content items, such ebooks, to the user. In addition, the client 130 provides a user interface (UI), such as physical and/or on-screen buttons, with which the user may interact with the client. For example, the user may highlight or otherwise annotate portions of the content.

The client 130 includes a presentation module 150 that presents digital content and other information to the user of the client. The presented content may include ebook text, video images, and other content from content items. In one embodiment, the presentation module 150 receives a list of key events for a content item from the content structure server 110. In addition, the presentation module 150 tracks the user's current position in the content item. For example, the presentation module 150 may track the user's current reading position in an ebook.

The presentation module 150 uses the list of key events in combination with the user's current position in the content item to determine which of the key events the user has encountered, and which key events the user has not yet encountered. For example, if A marries B at location 20, and they have child C at location 50, and the user's current position in the content item is location 30, then the user has encountered (e.g., read about) the "marriage" key event but not the "having a child" key event.

In one embodiment, the presentation module 150 filters social communications received by the client 130 to prevent the user from inadvertently learning about key events the user has not encountered. The presentation module 150 uses the user's position in the content item relative to the key events in the content item to filter out (e.g., block, redact, obscure, or otherwise flag) social communications received by the client 130 that relate to, or may relate to, key events in the content item not encountered by the user. In this way, the user may engage in social communications without inadvertently reading communications that give away (e.g., spoil) key events such as important plot points. In addition, the presentation module 150 may tag outgoing social media communications made by the user of the client 130 to support social communications filtering by other clients.

The social communications server 120 provides electronic discussion forums where users of clients 130 may discuss content items with other users. The social communications server 120 may maintain separate discussion forums for separate content items. For example, the social communications server 120 may have different forums for different ebooks.

Users of the clients 130 can participate in the forums by posting messages of their own and reading messages posted by other users. In one embodiment, the social communications server 120 filters messages using users' current locations and lists of key events in the content items in a manner similar to the presentation module 150 described above. Thus, the social communications server 120 allows users to discuss content items such as ebooks without risking that the users will inadvertently learn of key events that the users have not encountered.

The network 140 enables communications among the content structure server 110, social communications server 120, and clients 130. In one embodiment, the network 140 uses standard communications technologies and/or protocols. In another embodiment, the network 140 uses custom and/or dedicated data communications technologies.

In situations in which the systems discussed here collect personal information about users, or may make use of personal information, the users may be provided with an opportunity to control whether programs or features collect user information (e.g., information about content items a user has read or is reading, about a user's social network, social actions or activities, profession, or preferences), or to control whether and/or how to receive content from the servers that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by the content structure server 110, social communications server 120, and client 130.

Figure 2:
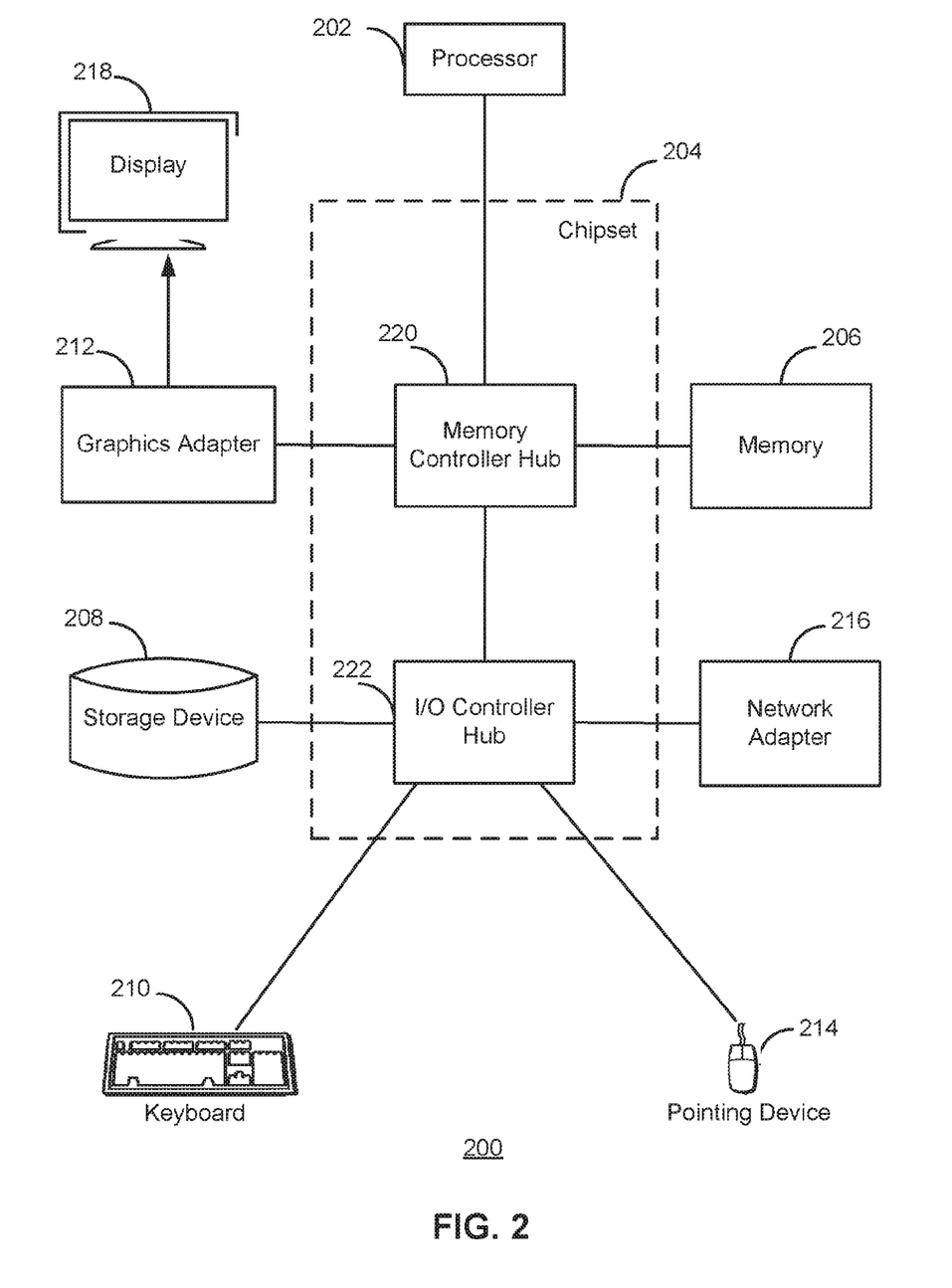
FIG. 2 is a high-level block diagram of a computer for acting as the content structure server, the social communications server, and/or a client according to one embodiment.

The entities shown in FIG. 1 are implemented using one or more computers. FIG. 2 is a high-level block diagram of a computer 200 for acting as the content structure server 110, the social communications server 120, and/or a client 130 according to one embodiment. Illustrated are at least one processor 202 coupled to a chipset 204. Also coupled to the chipset 204 are a memory 206, a storage device 208, a keyboard 210, a graphics adapter 212, a pointing device 214, and a network adapter 216. A display 218 is coupled to the graphics adapter 212. In one embodiment, the functionality of the chipset 204 is provided by a memory controller hub 220 and an I/O controller hub 222. In another embodiment, the memory 206 is coupled directly to the processor 202 instead of the chipset 204.

The storage device 208 is any non-transitory computer-readable storage medium, such as a hard drive, compact disk read-only memory (CD-ROM), DVD, or a solid-state memory device. The memory 206 holds instructions and data used by the processor 202. The pointing device 214 may be a mouse, track ball, touch sensitive display, or other type of pointing device, and is used in combination with the keyboard 210 to input data into the computer system 200. The graphics adapter 212 displays images and other information on the display 218. The network adapter 216 couples the computer system 200 to the network 150.

As is known in the art, a computer 200 can have different and/or other components than those shown in FIG. 2. In addition, the computer 200 can lack certain illustrated components. For example, the computers acting as the content server 110 can be formed of multiple blade servers linked together into one or more distributed systems and lack components such as keyboards and displays. Moreover, the storage device 208 can be local and/or remote from the computer 200 (such as embodied within a storage area network (SAN)).

The computer 200 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 208, loaded into the memory 206, and executed by the processor 202.

Figure 3:
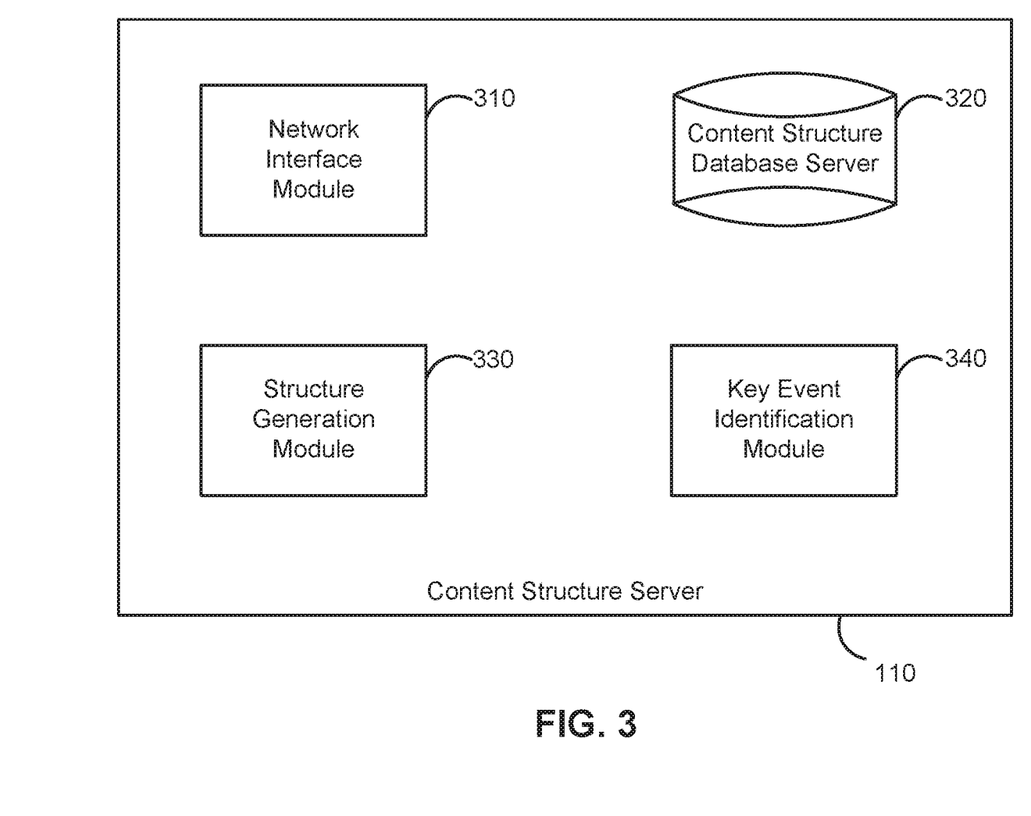
FIG. 3 is a high-level block diagram illustrating details of the content structure server according to one embodiment.

FIG. 3 is a high-level block diagram illustrating details of the content structure server 110 according to one embodiment. In the embodiment shown, the content structure server 110 contains a variety of different modules. Those of skill in the art will recognize that other embodiments of the content structure server 110 can have different and/or additional modules other than the ones described here, and that the functions may be distributed among the modules in a different manner.

A network interface module 310 sends and receives data on the network 140. The network interface module 310 allows the content structure server 110 to interface with other servers and clients 130 connected to the network. Via the network interface module 310, the content structure server 110 receives data such as content items (e.g., ebooks) and structure data used to identify key events in the content items. Likewise, the content structure server 110 uses the network interface module 310 to provide information such as lists of key events in the content items to the clients 130 and social communications server 120.

A content structure database module 320 (referred to as the "database") stores data used and generated by the content structure server 110. These data include the content items, data describing the structure of the content items, intermediate data generated while the content structure server 310 determines the structure of the content items, and lists of key events and associated locations in the content items. The database 320 may store additional and/or other data in other embodiments.

In more detail, an embodiment of the database 320 stores content items such as the text of ebooks, the videos of movies, and other such data. In one embodiment, the database 320 receives the content items from content distributors. The distributors are authoritative sources of the content items. For example, the content distributor for an ebook may be the publisher or author of the ebook.

In addition, the database 320 may store structure data received from the content distributors or other sources that describe the structure of the content items. In one embodiment, the content distributors provide structure data describing structured representations of the content items. For example, the publisher of an ebook may provide data indicating a list of entities associated with the ebook, a list of events involving the entities in the ebook, and descriptions of where in the ebook the events occur. The structure data may be provided separately from the content items, or may be embedded within the content items through the use of tags or other markers.

The database 320 may also store structure data received from the clients 130. In one embodiment, annotation data describing annotations of content items made by the users of the clients 130 are provided to the content structure server 110 and stored in the database 320. The annotation data identify annotated locations within the content items. The annotations may include comments made by the users that are associated with the annotated locations.

A structure generation module 330 analyzes content items in view of the structure data to generate structured representations of the content items. The structured representation of a content item describes the arrangement of, and relations between, the entities and events referenced in the content item. In addition, the structured representation of a content item associates the entities and events with specific locations in the content item. For example, if the content item is an ebook the structured representation of the ebook associates the entities and events with specific locations in the text where the entities and events are described or otherwise referenced.

The structured representation of a content item may also include importance scores indicating the relative importance of the entities and events to the content item. The importance scores may be represented using numeric values, where a higher value indicates more importance. Thus, a major character in a story may have a higher importance score than a minor character.

In one embodiment, the structure generation module 330 generates the structured representation of a content item as a graph that describes the relationships among the entities and events in the content item. The nodes of the graph represent entities and events, and the edges of the graph represent plot arcs—connections among the entities and events that relate to the plot. The edges of the graph may be directed so that the graph describes a sequence indicating the temporal order in which the entities are introduced and events occur in the content item.

The structure generation module 330 may generate the structured representation of a content item using one or more of a variety of techniques. In one embodiment, the structure data received from the content distributor explicitly describes the structure of the content item. Accordingly, the structure generation module 330 parses the structure data and generates the structured representation of the content item (e.g., the graph) therefrom. The structure data may explicitly specify importance scores for the entities and events in the content item. Additionally, the structure generation module 330 may derive the importance scores from the structure data by determining which entities or events are more important than others. For example, the structure generation module 330 may determine the relative importances of entities based on how often the entities are referenced in the structure data and/or content item, and determine the relative importance of events based on the importances of the entities associated with the events.

In another embodiment, the structure generation module 330 uses implicit structure data, such as annotations, to generate the structured representation of a content item. To this end, the structure generation module 330 analyzes annotations of a content item received from many different users to determine the frequencies at which individual portions of the content item are annotated. The frequency of annotations is treated as a signal for the relative importance of the annotated portions, with more frequent annotations signaling greater importance of the annotated portions. In addition, the structure generation module 330 may analyze the annotated portions of the content item, as well as the comments within the annotations, to identify and determine the importance of the entities or events referenced therein. The structure generation module 330 uses this information to derive the importance scores for the entities and events.

Furthermore, the annotation data may explicitly describe the structure of a content item. In one embodiment, the users of the clients 130 make annotations that explicitly describe the structure of the content. For example, the users may make an annotation that explicitly flags a location in the content item as relating to a specific entity or event, and/or indicates the relative importance of the annotated portion. The structure generation module 330 uses this information to derive the importance scores.

In still another embodiment, the structure generation module 330 analyzes the content within the content item to generate the structured representation. For an ebook, the structure generation module 330 may apply natural language processing in combination with machine learning techniques to identify entities and events referenced in the text. In addition, the structure generation module 300 may identify portions of the content items that are more important compared to other portions, as well as the entities and events referenced in these portions, and use this information to derive the importance scores.

A key event identification module 340 analyzes structured representations of content items to identify key events described therein. The key event identification module 340 thus produces a list of key events for a content item, such as for a particular ebook. The lists of key events are stored in the database 320, and are also provided to the clients 130 and/or the social communications server 120.

The structured representation of a content item may explicitly identify the key events. For example, the structure data received from the content distributor may explicitly identify certain events as key events for a content item. Likewise, the annotations received from the users may explicitly identify the key events. In this case, the key event identification module 340 may list the identified events as the key events for the content item. The key event identification module 340 may also combine and/or weight information received from users in order to identify the key events. For example, the key event identification module 340 may list an explicitly-identified event as a key event only if a threshold number of users designate the event as being key.

Additionally, the key event identification module 340 may use the importance scores in a structured representation of a content item to identify the key events for that item. In one embodiment, the key event identification module 340 identifies events of more than a threshold level of importance as key events. The threshold used by the module 340 may vary in different embodiments. The threshold may be a fixed value, so that all events with importance scores exceeding the fixed value are identified as key events. The threshold may also be a variable value, with the value set so that only the N most important events are identified as key events, where N is an integer such as five. Other embodiments may use additional and/or different techniques to identify the key events for a content item.

Figure 4:
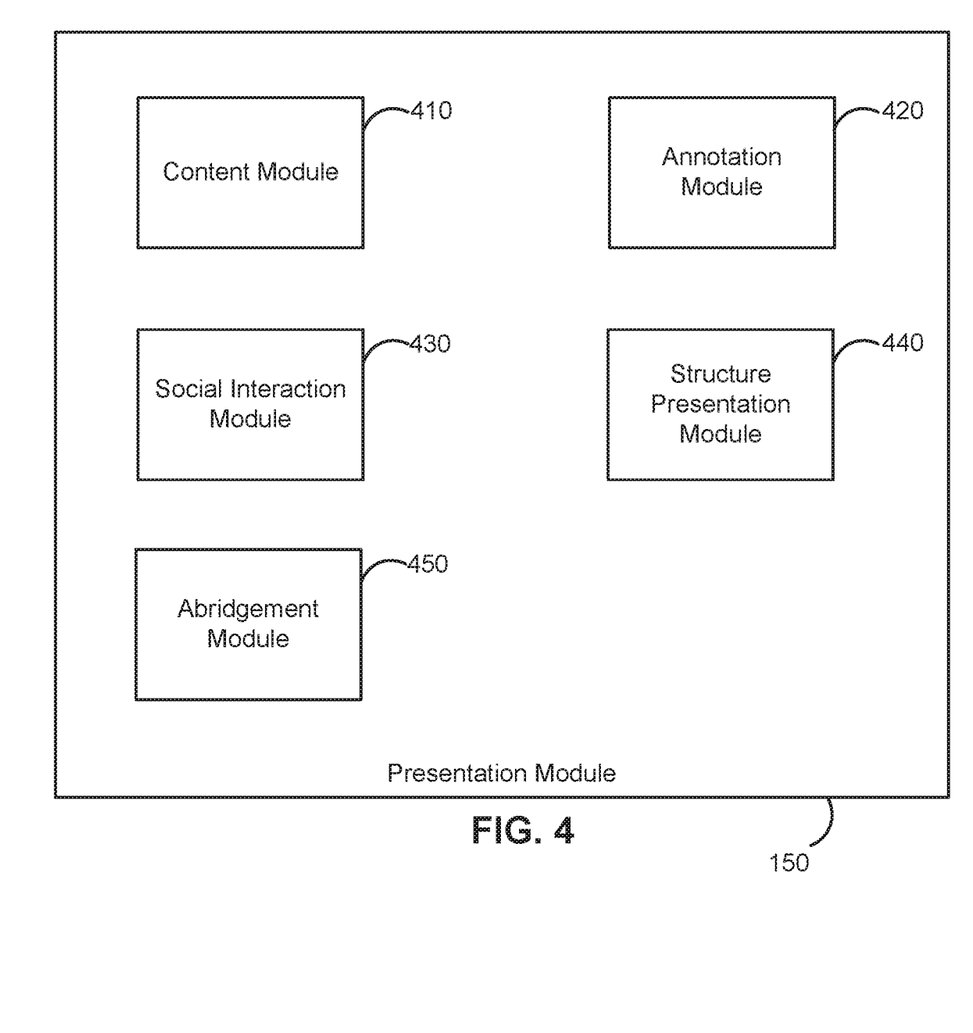
FIG. 4 is a high-level block diagram illustrating details of the presentation module of a client according to one embodiment.

FIG. 4 is a high-level block diagram illustrating details of the presentation module 150 of a client 130 according to one embodiment. In the embodiment shown, the presentation module 150 contains a variety of different modules. Other embodiments of the presentation module 150 can have different and/or additional modules other than the ones described here, and that the functions may be distributed among the modules in a different manner.

A content module 410 presents content items such as ebooks to a user using the client 130. The content can be presented visually on a display of the client 130 and/or as audio content (e.g., a pre-recorded narrator reading or using text-to-speech technology). The content module 410 also communicates with servers on the network 140, such as the content structure server 110, order to obtain content items, lists of key events for content items, structured representations of content items, and other data.

The content module 410 also tracks the current location of the user in the content item. That is, the content module 410 tracks which portions of the content item the user has consumed. For example, the content module 410 tracks the user's current reading location in an ebook.

An annotation module 420 provides a user interface in conjunction with the content item being presented by the content module 410 that enables a user to add annotations to the content item. The annotations include annotation comments and annotation metadata. An annotation comment is the body of an annotation that is provided by the user and can include text, images, audio recordings, video, and the like. Annotation metadata, in contrast, is any additional information about the annotation comment, such as the specific content item and portion thereof to which the annotation corresponds and the identity of the user. The annotation 420 may specify the portion of content item to which the annotation corresponds as a position range, including a start position and an end position in the content item.

In one embodiment, the annotation module 420 enables a user to explicitly specify the structure of a content item. As mentioned earlier, the annotation module 420 may allow the user to explicitly indicate that the annotated portion of the content item references a particular entity or event. Likewise, the annotation module 420 may allow the user to explicitly specify the relative importance of entities or events, and to identify key events. To this end, the annotation module 420 may accept textual annotations that contain explicit strings describing these aspects of the structure of the content item. For example, the annotation module 420 may accept the annotation content "#key event" as labeling a key event.

In another embodiment, the annotation module 420 provides the user with one or more dialog boxes or other user interface elements that query the user as to the structure of the content. For example, the annotation module 420 can ask the user to explicitly identify key events, or to rate the relative importance of events or entities referenced in an annotated portion. In addition, the annotation module 420 can ask the user to vote on annotations made by other users. For example, a user can vote on whether another user has correctly identified a portion of a content item as relating to a key event.

A social interaction module 430 monitors social communications received and sent by the user of the client 130 to prevent users from inadvertently learning about key events that the users have not encountered in content items. The social interaction module 430 receives the user's current location in a content item and a list of key events in the content item from the content module 410.

In one embodiment, the social interaction module 430 identifies outgoing social communication messages made by the user of the client 130 that pertain to a content item presented by the content module 410. The social interaction 430 module may identify pertinent messages by examining data within the messages for keywords or other signifiers that the messages pertains to the content item. In addition, the social interaction module 430 may examine the destination of the message (e.g., the network address to which the message is being sent) to determine whether the destination pertains to the content item (e.g., whether the message is directed to a forum of the social communications server 120 dedicated to the content item).

If the message pertains to a content item presented by the content module 410, the social interaction module 430 tags the message with context information identifying the content item and the user's current position in the content item. The current position may be specified as an absolute position in the content item, or specified as an interval between two specified key events.

In addition, the social interaction module 430 identifies incoming social communication messages made by users of other clients 130 that pertain to content items presented by the content module 410. In one embodiment, the social interaction module 430 monitors incoming social media communications to determine whether the communications are tagged with context information. If a communication is so tagged, the social interaction module 430 parses the tag to identify the content item, and the location in the content item, to which the communication pertains.

If the tag indicates that the content item to which the communication pertains is a content item presented by the content module 410 (e.g., the communication pertains to an ebook being read by the user), the social interaction module 430 determines whether the location in the content item to which the message pertains is after a key event not encountered by the user. If the message pertains to a location after a key event not encountered by the user, the social interaction module 430 filters out the message to prevent the user from inadvertently seeing it. The social interaction module 430 allows the user to see the message if it does not pertain to a location in the content item after a key event not encountered by the user.

For example, assume the content item is an ebook telling a story in which A marries B at location 20, A and B have a fight at location 30, and they have child C at location 50. However, the fight at location 30 is inconsequential to the overall story and therefore not a key event. If the user has read up to location 25 of the ebook, the social interaction module 430 allows the user to see a message that pertains to location 30 because the fight described at that location is not a key event. However, the presentation module 150 filters out any messages that pertain to location 50 or later because such messages may refer to the birth of C, a key event not yet encountered by the user.

A structure presentation module 440 presents the user of the client 130 with graphical representations of the structures of content items. The structure presentation module 440 receives the structured representation of a content item from the content module 410. Recall that in one embodiment the structured representation is a graph that describes the entities and events in the content item. The structure presentation module 440 graphically displays this graph on the client 130. This display allows the user of the client 130 to visually perceive the structure of the content item, and may enhance the user's understanding and enjoyment of the content item. For example, the display may allow the user to better understand the relationships between the entities and events described in an ebook.

Further, an embodiment of the structure presentation module 440 modifies the structured representation to show only portions of the representation that relate to portions of the content item already consumed by the user. For example, the illustrated graph structure can show only the characters, events, and plot arcs in the portion of an ebook read by the user. The structure presentation module 440 can also illustrate how the content item develops over time by showing an animation of how the graph develops linearly through the content. Furthermore, the structure presentation module 440 can use different illustrations in the graphical representation to represent different types of entities, events, and plot arcs.

An abridgment module 450 provides the user of the client 130 with abridged versions of content items based on the structured representations. In one embodiment, the abridgement module 450 causes the content module 410 to present portions of a content item related to entities and events described in the structured representation of the content. For example, the abridgment module 450 may cause the content module 410 to present only portions of the content item related to a specific character or event, thereby forming an abridged version of the content item.

The abridgement module 450 may present an interface to the user that allows the user to specify which abridged content to present. For example, the abridgement module 450 may provide the user with a list of characters referenced in an ebook. Upon receiving the selection of a character, the abridgement module 450 may analyze the structured representation of the ebook to identify the portions of the ebook that reference the character, and cause only these portions to be displayed by the content module 410.

Figure 5:
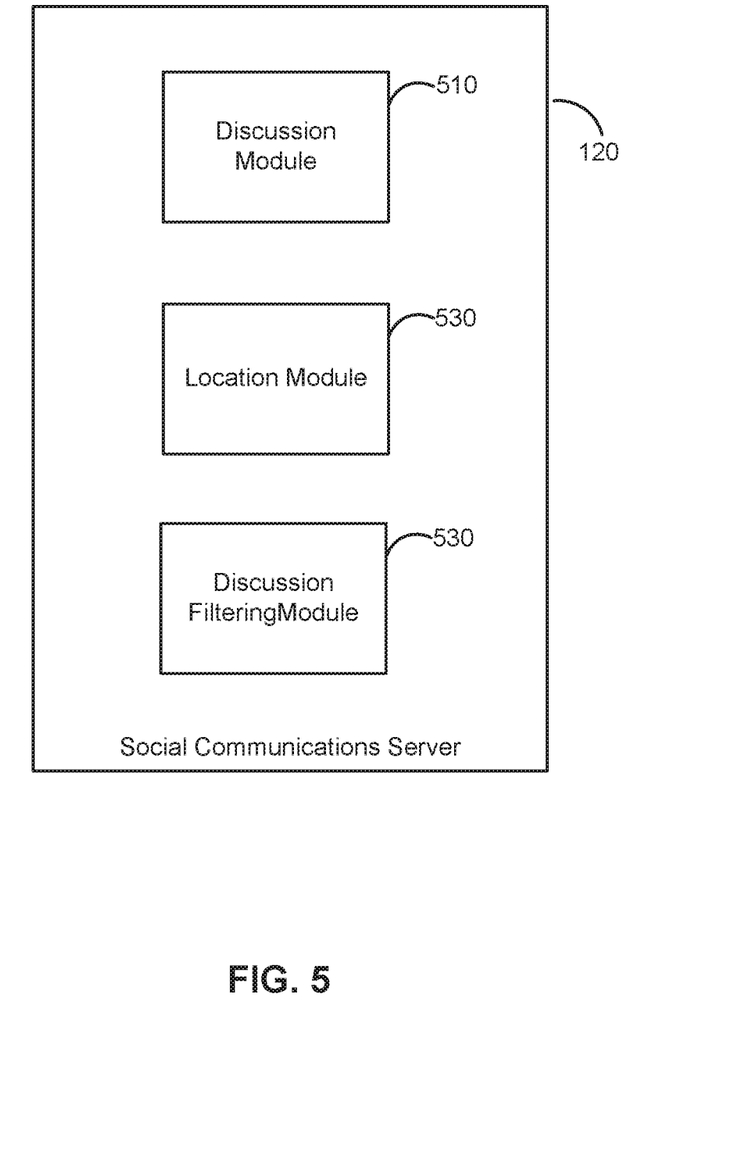
FIG. 5 is a high-level block diagram illustrating details of the social communications server according to one embodiment.

FIG. 5 is a high-level block diagram illustrating details of the social communications server 120 according to one embodiment. In the embodiment shown, the social communications server 120 contains a variety of different modules. Other embodiments of the social communications server 120 can have different and/or additional modules other than the ones described here, and that the functions may be distributed among the modules in a different manner.

A discussion module 510 provides discussion forums for digital content items. As mentioned earlier, users of the clients 130 can participate in the forums by posting messages of their own and reading messages posted by other users. Depending upon the embodiment, the discussion module 510 may provide a single or multiple discussion forums for a content item.

In the latter embodiment, the forum for a content item may include multiple subforums. Each subforum is associated with an intervals between key events in the content item. For example, if the key events for a content item include A marrying B at location 20, and A and B having a child C at location 50, the discussion module 510 may maintain one subforum for the interval between locations zero and 19, another subforum for the interval between locations 20 and 49, and a third subforum for the interval between location 50 and the location of the next key event. The subforums may be virtual in the sense that the users who participate in the discussion forums are not necessarily aware of the logical division of the forum for the content item into subforums. Rather, each subforum is presented to the users as if it is the only forum for the content item.

A location module 520 determines the current locations of users in content items about which the users are posting in the discussion forums. The location module 520 may determine the current locations from context information in the tags applied to outgoing social communications by the clients 130. The location module 520 may also determine the current locations using other techniques, such as by querying the users for this information or by receiving the location information from the clients 130 via other channels.

A discussion filtering module 530 filters the discussions in the discussion forums provided by the discussion module 510 based on the users' current locations in the content items and the key events for the content items. This filtering prevents users from inadvertently learning of key events they have not encountered in the content items.

In an embodiment in which there are multiple subforums for a content item, the discussion filtering module 530 automatically places users in the subforum corresponding to the user's current location in the content item. Thus, if the subforums correspond to intervals between key events, the discussion filtering module 530 places a user in the subforum for the interval containing the user's current location. In this manner, the user discusses the content item with only other users who are at approximately the same location in the content item. While the users may be at different locations, the other users have encountered the same set of key events in the content item. Thus, it is unlikely that a post from one user will inadvertently expose the other users to key events of which they are not already aware. The discussion filtering module 530 advances the users to the appropriate subforums as the users move through the content items.

In an embodiment having a single discussion forum for a content item, the discussion filtering module 530 filters individual messages based on current locations and key events to prevent users from reading messages about key events they have not encountered. For a user participating in a forum, the discussion filtering module 530 identifies and filters out any messages made by other users who have current locations past a key event not yet encountered by the first user. This filtering prevents the user from reading messages that might expose key events of which the user is not aware.

Figure 6:
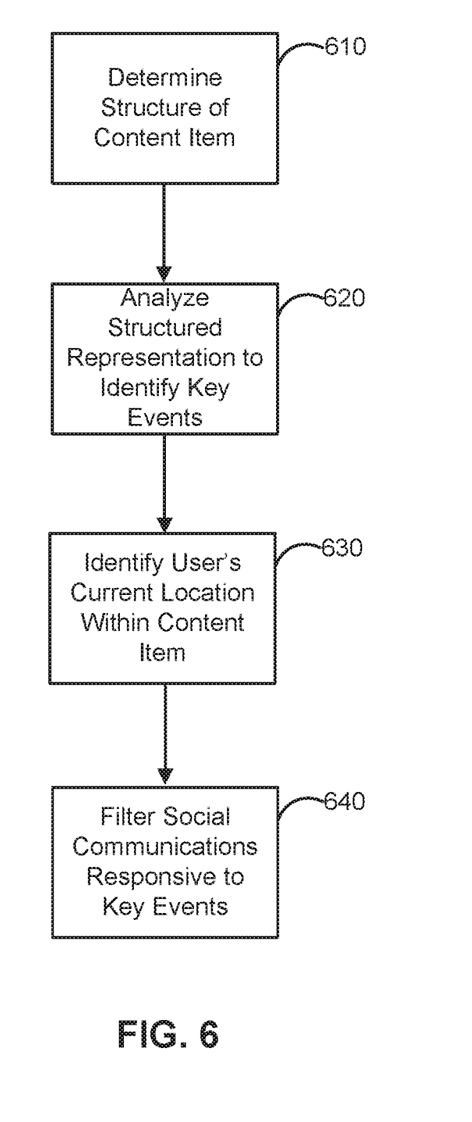
FIG. 6 is a flowchart illustrating a process for using content structure to socially connect users according to one embodiment.

FIG. 6 is a flowchart illustrating a process for using content structure to socially connect users according to one embodiment. While the descriptions of FIGS. 1-5 attribute some of these steps to specific entities illustrated in those figures, the steps may be performed by other entities in some embodiments. In addition, some embodiments may perform the steps in parallel, perform the steps in different orders, or perform different steps.

The structure of a content item is determined 610 in order to produce a structured representation of it. The structure may be determined using explicit structure data received from a content distributor or other source. The structure may also be determined using implicit structure data such as annotations of the content item received from clients 130. The structured representation of the content item includes importance scores indicating the relative importance of entities and events within the content item. In one embodiment, the structured representation of the content item is a graph with nodes representing entities and events and edges representing connections among the entities and events that relate to the plot.

The structured representation of the content item is analyzed 620 to identify key events within it. The structured representation may explicitly identify the key events. In addition, the importance scores of the entities and events may be used to identify the key events. For example, events having importance scores that exceed a threshold may be identified as key events. The key events are associated with locations in the content item, such that intervals are formed between key events in the content item.

A user's current location in the content item is determined 630. For example, if the content item is an ebook, the user's current reading location in the ebook is determined. The current location falls within one of the intervals formed between the identified key events in the content item. In one embodiment, the user's outbound social communication messages are tagged with context information including an identifier of the content item and the location in the content item to which the message pertains (e.g., the user's current location in the content item).

The user's social communications about the content item are filtered 640 responsive to the key events. Specifically, the user's inbound social communication messages are filtered 640 to prevent the user from being inadvertently exposed to information about key events not encountered by the user. The inbound social communications may be filtered such that the user sees only communications from other users having current locations in the same interval between key events as the user. In this manner, the user is unlikely to view communications that relate to key events in the content item that occur after the user's current location.

The techniques for using content structure to socially connect users described above may be used in different configurations and embodiments. For example, embodiments may lack a social communications server 120 and instead use the social interaction modules 430 of the clients 130 to filter social communications. Alternatively, embodiments may include a social communications server 120 that receives tagged social communications from the clients 130 and performs filtering on behalf of the clients, so that the social interaction modules 430 of the clients need not perform any additional filtering. In some embodiments, the content structure server 110 is absent and its functions are performed by modules in the clients 130 or other entities.

In addition, the users need not be consuming the same types of content items. For example, the techniques described above may be used to filter communications between readers of ebooks and watchers of videos corresponding to the ebooks. Social communications between readers at certain locations in the ebooks may be filtered with respect to watchers at certain locations in the movies and vice versa. Likewise, the techniques can be used to filter social communications among readers of different versions of content items, such as full and abridged versions of ebooks.

The above description is included to illustrate the operation of the preferred embodiments and is not meant to limit the scope of the invention. The scope of the invention is to be limited only by the following claims. From the above discussion, many variations will be apparent to one skilled in the relevant art that would yet be encompassed by the spirit and scope of the invention.

What is claimed is:

1. A computer-implemented method of using a structure of a digital content item to socially connect users consuming the digital content item, comprising:
    determining a structured representation of the digital content item that describes a semantic meaning of content within the digital content item;
    analyzing the structured representation to identify key events within the digital content item, each identified key event having a respective location within the digital content item;
    identifying a user's current location within the digital content item; and
    preventing the user from reading social communication messages, made by other users who have current locations past a key event within the digital content item that the user has not encountered, while enabling electronic social communications of the user on a social communication network by at least filtering the electronic social communications on the social communications network based on the user's current location within the digital content item and the identified key events within the digital content item, the filtering comprising:
        determining, based on the user's current location within the digital content item and the respective locations of the identified key events within the digital content item, one or more key events of the identified key events within the digital content item that the user has not encountered;
        identifying the social communication messages made by the other users who have current locations within the digital content item past the respective location of any of the one or more key events of the identified key events within the digital content item that the user has not encountered; and
        filtering out the identified social communication messages made by the other users who have current locations past the respective locations of any of the one or more key events that the user has not encountered.

2. The computer-implemented method of claim 1, wherein determining the structured representation of the digital content item comprises:
    receiving annotation data for the digital content item from a plurality of users;
    determining, based on the annotation data, frequencies at which portions of the digital content item are annotated; and
    determining relative importances of the portions of the digital content item based on the determined frequencies;
    wherein the key events within the digital content item are identified based on the relative importances of the portions.

3. The computer-implemented method of claim 1, wherein analyzing the structured representation to identify key events comprises:
    examining the semantic meaning of the content within the digital content item to identify a plurality of events described within the digital content item;
    determining relative importances of the plurality of events; and
    identifying a subset of the plurality of events as key events based on the relative importances of the plurality of events.

4. The computer-implemented method of claim 1, wherein identifying the user's current location within the digital content item comprises:
    determining a current reading position of the user in the digital content item.

5. The computer-implemented method of claim 1, wherein filtering electronic social communications further comprises:
    providing a plurality of electronic discussion forums for the digital content item, the electronic discussion forums corresponding to a plurality of intervals between key events of the identified key events within the digital content item;
    determining an interval of the plurality of intervals containing the user's current location in the digital content item; and
    placing the user in an electronic discussion forum of the plurality of electronic discussion forums corresponding to the interval containing the user's current location in the digital content item.

6. The computer-implemented method of claim 1, wherein identifying the user's current location within the digital content item comprises:
    receiving a social communication message from the user; and
    parsing a tag associated with the received social communication message to determine a location in the digital content item to which the social communication message pertains.

7. A non-transitory computer-readable storage medium storing executable computer program instructions for using a structure of a digital content item to socially connect users consuming the digital content item, the instructions executable to:
    determine a structured representation of the digital content item that describes a semantic meaning of content within the digital content item;
    analyze the structured representation to identify key events within the digital content item, each identified key event having a respective location within the digital content item;
    identify a user's current location within the digital content item; and
    prevent the user from reading social communication messages, made by other users who have current locations past a key event within the digital content item that the user has not encountered, while enabling electronic social communications of the user on a social communication network by at least filtering the electronic social communications on the social communications network based on the user's current location within the digital content item and the identified key events within the digital content item, the filtering comprising:
        determining, based on the user's current location within the digital content item and the respective locations of the identified key events within the digital content item, one or more key events of the identified key events within the digital content item that the user has not encountered;

identifying the social communication messages made by the other users who have current locations within the digital content item past the respective location of any of the one or more key events of the identified key events within the digital content item that the user has not encountered; and filtering out the identified social communication messages made by the other users who have current locations past the respective locations of any of the one or more key events that the user has not encountered.

8. The non-transitory computer-readable storage medium of claim 7, wherein the instructions are further executable to determine the structured representation of the digital content item by at least being executable to:

receive annotation data for the digital content item from a plurality of users;

determine, based on the annotation data, frequencies at which portions of the digital content item are annotated; and determine relative importances of the portions of the digital content item based on the determined frequencies;

wherein the key events within the digital content item are identified based on the relative importances of the portions.

9. The non-transitory computer-readable storage medium of claim 7, wherein the instructions are further executable to analyze the structured representation to identify key events by at least being executable to:

examine the semantic meaning of the content within the digital content item to identify a plurality of events described within the digital content item;

determine relative importances of the plurality of events; and identify a subset of the plurality of events as key events based on the relative importances of the plurality of events.

10. The non-transitory computer-readable storage medium of claim 7, wherein the instructions are further executable to identify the user's current location within the digital content item by at least being executable to:

determine a current reading position of the user in the digital content item.

11. The non-transitory computer-readable storage medium of claim 7, wherein the instructions are further executable to filter electronic social communications by at least being executable to:

provide a plurality of electronic discussion forums for the digital content item, the electronic discussion forums corresponding to a plurality of intervals between key events of the identified key events within the digital content item;

determine an interval of the plurality of intervals containing the user's current location in the digital content item; and place the user in an electronic discussion forum of the plurality of electronic discussion forums corresponding to the interval containing the user's current location in the digital content item.

12. The non-transitory computer-readable storage medium of claim 7, wherein the instructions are further executable to identify the user's current location within the digital content item by at least being executable to:

receive a social communication message from the user; and parse a tag associated with the received social communication message to determine a location in the digital content item to which the social communication message pertains.

13. A computing device for using a structure of a digital content item to socially connect a user consuming the digital content item using the computing device, comprising:

a computer processor for executing computer program instructions; and a non-transitory computer-readable storage medium storing computer program instructions executable to:

identify the user's current location within the digital content item; and prevent the user from reading social communication messages, made by other users who have current locations past a key event within the digital content item that the user has not encountered, while enabling electronic social communications of the user on a social communication network by at least filtering the electronic social communications on the social communications network based on the user's current location within the digital content item and key events within the digital content item, the key events identified responsive to determining a structured representation of the digital content item that describes a semantic meaning of content within the digital content item and analyzing the structured representation, the filtering comprising:

determining, based on the user's current location within the digital content item and the respective locations of the identified key events within the digital content item, one or more key events of the identified key events within the digital content item that the user has not encountered;

identifying the social communication messages made by the other users who have current locations within the digital content item past the respective location of any of the one or more key events of the identified key events within the digital content item that the user has not encountered; and filtering out the identified social communication messages made by the other users who have current locations past the respective locations of any of the one or more key events that the user has not encountered.

14. The computing device of claim 13, wherein the instructions are further executable to:

receive an annotation of a portion of the digital content item from the user; and provide annotation data describing the annotation to a content structure server, wherein the content structure server is adapted to:

receive annotation data for the digital content item from a plurality of users;

determine, based on the annotation data, frequencies at which portions of the digital content item are annotated;

identify key events within the digital content item based on the frequencies at which portions of the digital content item are annotated; and provide a list of the identified key events within the digital content item to the computing device.

15. The computing device of claim 13, wherein instructions are further executable to:

provide a user interface adapted to receive an identification of a key event of the identified key events within the digital content item from the user; and receive, via the user interface, the identification of the key event within the digital content item from the user.

16. The computer device of claim 13, wherein the instructions are further executable to analyze the structured representation by at least being executable to:

examine the semantic meaning of the content within the digital content item to identify a plurality of events described within the digital content item;

determine relative importances of the plurality of events; and identify a subset of the plurality of events as key events based on the relative importances of the plurality of events.

17. The computing device of claim 13, wherein the instructions are further executable to filter electronic social communications by at least being executable to:

identify an outbound electronic social communication made by the user pertaining to the digital content item; and tag the outbound electronic social communication with context information identifying the content item and the user's current location within the digital content item.

18. The computing device of claim 13, wherein the instructions are further executable to identify the user's current location within the digital content item by at least being executable to:

determine a current reading position of the user in the digital content item.

* * * * *